(12) United States Patent
Thornburg et al.

(10) Patent No.: US 9,754,607 B2
(45) Date of Patent: Sep. 5, 2017

(54) ACOUSTIC SCENE INTERPRETATION SYSTEMS AND RELATED METHODS

(71) Applicant: Apple Inc., Cupertino, CA (US)

(72) Inventors: Harvey D. Thornburg, Sunnyvale, CA (US); Charles Pascal Clark, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 78 days.

(21) Appl. No.: 14/836,810

(22) Filed: Aug. 26, 2015

(65) Prior Publication Data

US 2017/0061969 A1    Mar. 2, 2017

(51) Int. Cl.
*G10L 15/00* (2013.01)
*G10L 25/51* (2013.01)
*G10L 17/26* (2013.01)
*G10L 15/26* (2006.01)
*G10L 25/27* (2013.01)

(52) U.S. Cl.
CPC ............. *G10L 25/51* (2013.01); *G10L 15/26* (2013.01); *G10L 17/26* (2013.01); *G10L 25/27* (2013.01)

(58) Field of Classification Search
None
See application file for complete search history.

(56) References Cited

U.S. PATENT DOCUMENTS 8,874,440 B2 * 10/2014 Park ........................ G10L 25/78
704/233
9,020,822 B2 *  4/2015 Kalinli-Akbacak .... G10L 25/63
704/270
2002/0037087 A1 *  3/2002 Allegro ................. H04R 25/407
381/317
2010/0324897 A1 * 12/2010 Emori ..................... G10L 15/04
704/243
2012/0173234 A1    7/2012 Fujimoto et al.
2013/0054236 A1    2/2013 Garcia Martinez et al.
2015/0058003 A1 *  2/2015 Mohideen ............... G10L 15/20
704/233

OTHER PUBLICATIONS

Pikrakis et al. Speech-music discrimination for radio broadcasts using a hybrid HMM bayesian network architecture, 14th European Signal Processing Conference (EUSIPCO 2006), Florence, Italy, Sep. 4-8, 2006.

* cited by examiner

*Primary Examiner* — Marcus T Riley
(74) *Attorney, Agent, or Firm* — Ganz Pollard, LLC

(57) ABSTRACT

An acoustic-scene interpretation apparatus can have a transducer configured to convert an acoustic signal to a corresponding electrical signal. A feature extractor can receive a sequence of frames representing the electrical signal and extract a plurality of acoustic features corresponding to each frame. An acoustic-scene classifier can be configured to determine a most-likely acoustic state for each frame in the sequence of frames in correspondence with the respective plurality of acoustic features corresponding to the frame and a selected probability distribution of duration of an acoustic state for each of one or more classes of acoustic scenes. Each respective probability distribution of duration can correspond to a selected class of acoustic scenes. The correspondence between acoustic state and probability distribution of duration can be learned from training data corresponding to each of a plurality of classes of acoustic scenes. Related methods also are disclosed.

18 Claims, 11 Drawing Sheets

ACOUSTIC SCENE INTERPRETATION SYSTEMS AND RELATED METHODS

BACKGROUND

This application, and the innovations and related subject matter disclosed herein, (collectively referred to as the "disclosure") generally concern systems for interpreting acoustic scenes and associated techniques. More particularly but not exclusively, disclosed acoustic-scene classification systems and associated processing techniques can be incorporated in acoustic-scene interpretation systems. For example, a disclosed acoustic-scene interpretation system can have a module configured to classify an observed acoustic scene according to one or more selected classes of acoustic scenes, with speech, music, vehicle traffic, and animal activity being but particular, non-limiting, examples of acoustic-scene classes. Some disclosed interpretation systems that classify observed acoustic scenes can select an acoustic recognition engine (or module) suitable for interpreting the observed class of acoustic scene, improving computational efficiency. And, some disclosed classification modules incorporate event-duration models to inform an assessment of an observed acoustic scene. Such duration models can improve the accuracy and computational efficiency of classification systems and acoustic-scene interpretation systems as compared to previously proposed systems.

As used herein, the phrase "acoustic scene" means an event or a sequence of events giving rise to an acoustic signal diffused in an environment associated with the event or sequence of events. Generally speaking, acoustic-scene interpretation concerns assessing or determining, or otherwise inferring, information about the event or sequence of events and/or the associated environment forming a given acoustic scene from observations of the diffused acoustic signal. Such information, which can vary in time, can be used to associate the acoustic scene with one or more selected classes of acoustic scenes.

Acoustic-scene classification generally involves three aspects. First, signal processing techniques can be applied to a sequence of frames representing an acoustic signal to derive several statistical measures (sometimes referred to in the art as "acoustic features") of each frame. Second, tuned acoustic models (e.g., machine learning systems) can determine one or more activity hypotheses that explain the observed combinations of acoustic features. Third, a heuristic layer can be applied to the activity hypotheses in an attempt to resolve or otherwise "clean up" apparent mistakes made by the inference module.

A common problem faced by previously known scene classification systems is that the inference module often makes mistakes, which manifest as spurious, short-lived classifications (sometimes referred to as "false detections" or "gaps"). A heuristic layer can remove mistakes or fill in gaps in classifications made by the inference layer, but such processing by the heuristic module can result in substantial computational overhead and inefficient speech recognition or other acoustic-scene interpretation systems.

Thus, a need remains for computationally efficient techniques for classifying acoustic scenes, as well as computationally efficient scene classifiers. As well, a need remains for relatively more accurate inference techniques and modules. And, improved acoustic-scene interpretation systems, including real-time interpretation systems, are needed.

SUMMARY

The innovations disclosed herein overcome many problems in the prior art and address one or more of the aforementioned or other needs. In some respects, the innovations disclosed herein are directed to acoustic-scene interpretation systems, and more particularly, but not exclusively to efficient, data-driven acoustic-scene classification systems and associated techniques. Some disclosed acoustic-scene interpretation systems take the form of automatic speech recognition systems and some disclosed acoustic-scene classifiers take the form of voice-activity detectors suitable for use in such automatic speech recognition systems.

Some disclosed acoustic-scene classifiers, and more particularly but not exclusively, some inference modules of such classifiers, are informed by one or more statistical models of acoustic-event durations. The event-duration models can be tuned with training data from a variety of classes of acoustic scene, with each set of training data reflecting an acoustic signal from a given class of acoustic scenes.

As well, some disclosed inference modules and associated techniques incorporate a so-called "Mix Viterbi" approach to decoding activity hypotheses in real time. Such inference modules and associated techniques can be informed by acoustic features derived from a representation of an observed acoustic signal, as well as by tuned event-duration models. As a consequence, data-driven activity hypotheses can be generated in real time. In many instances, such inference modules provide relatively more accurate activity hypotheses than conventional inference modules, reducing error rates (e.g., spurious or short-lived "false detections") because disclosed systems recognize such events to be improbable based on the data-driven, or tuned, event-duration models. Consequently, computational loads imposed by a heuristic layer can be lower than in previously proposed systems.

Acoustic-scene interpretation apparatus are disclosed. A transducer can be configured to convert an acoustic signal to a corresponding electrical signal. A feature extractor can receive a representation of the electrical signal (e.g., having a sequence of frames) and extract a plurality of acoustic features corresponding to each respective frame. An acoustic-scene classifier can be configured to determine a most-likely acoustic state for each frame in the sequence of frames in correspondence with the respective plurality of acoustic features corresponding to the frame and a selected probability distribution of duration of an acoustic state for each of one or more classes of acoustic scenes.

In some embodiments, each respective probability distribution of duration can correspond to a selected class of acoustic scenes. The correspondence between acoustic state and probability distribution of duration can be learned from training data corresponding to each of a plurality of classes of acoustic scenes.

The plurality of acoustic features can include at least one linear combination of constituent acoustic features correlated to a selected class of acoustic signal. Examples of acoustic-signal classes include, but are not limited to, speech, music, silence, vehicle traffic, and animal activity. As one example, the acoustic-scene classifier can be part of a voice-activity detector, as might be found in an automatic speech recognition system.

Some disclosed embodiments of scene-interpretation apparatus have a recognition engine configured to determine a transcription of the incoming acoustic signal in at least partial correspondence with each respective most-likely acoustic state determined for each frame in the sequence of frames. For example, a detector can be configured to detect a beginning or a terminus of an acoustic event corresponding to a change in the most-likely acoustic state. As a consequence, further processing (e.g., transcription or other interpretation processing) can selectively be started or terminated. Such selective starting or terminating of interpretation processing can be used to allocate available computational resources. In some instances, the recognition engine includes at least one of a speech-recognition engine, a music-recognition engine, a vehicle-recognition engine and an animal-recognition engine.

Related methods also are disclosed. For example, a method of interpreting an observed acoustic scene can include converting an incoming acoustic signal to a corresponding electrical signal. A representation of the corresponding electrical signal can be received, as by an inference engine, and can include a sequence of frames. A plurality of acoustic features corresponding to each respective frame can be extracted from the representation of the signal. A most-likely acoustic state for each current frame in the sequence of frames can be determined in correspondence with the respective plurality of acoustic features corresponding to the current frame and a selected probability distribution of duration of an acoustic state for each of one or more classes of acoustic scenes.

For example, the correspondence between the most-likely acoustic state for each current frame and each respective probability distribution of duration can include information learned from one or more observed signals emitted from each of a plurality of classes of acoustic scenes. And, each respective probability distribution of an acoustic state can correspond to a given class of acoustic scenes.

Some disclosed methods also include detecting a beginning or a terminus of an acoustic event corresponding to a change in the most-likely acoustic state.

Some disclosed methods also include determining a transcription of the incoming acoustic signal in at least partial correspondence with each respective most-likely acoustic state determined for each frame in the sequence of frames. For example, a human- or a machine-recognizable representation of the incoming acoustic signal, an attribute characteristic of a class of music, an attribute characteristic of a class of vehicle, or an attribute characteristic of a class of animal can be identified.

Also disclosed are tangible, non-transitory computer-readable media including computer executable instructions that, when executed, cause a computing environment to implement one or more methods disclosed herein. Digital signal processors suitable for implementing such instructions are also disclosed.

The foregoing and other features and advantages will become more apparent from the following detailed description, which proceeds with reference to the accompanying drawings.

BRIEF DESCRIPTION OF THE DRAWINGS

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation.

DETAILED DESCRIPTION

The following describes various innovative principles related to acoustic-scene interpretation systems and related techniques by way of reference to specific acoustic-scene interpretation system embodiments. For example, certain aspects of disclosed subject matter pertain to systems and techniques for classifying acoustic scenes, and more particularly but not exclusively to systems and techniques informed by trained event-duration models. Embodiments of such systems described in context of specific acoustic scenes (e.g., human speech, music, vehicle traffic, and animal activity) are but particular examples of contemplated systems for interpreting acoustic scenes and are chosen as being convenient illustrative examples of disclosed principles. One or more of the disclosed principles can be incorporated in various other acoustic-scene interpretation systems to achieve any of a variety of corresponding system characteristics.

Thus, acoustic-scene interpretation systems (and associated techniques) having attributes that are different from those specific examples discussed herein can embody one or more presently disclosed innovative principles, and can be used in applications not described herein in detail, for example, in manufacturing systems, in security systems, in agricultural systems, etc. Accordingly, such alternative embodiments can also fall within the scope of this disclosure.

I. OVERVIEW

Unlike conventional systems, disclosed acoustic-scene interpretation systems can classify observed acoustic scenes based, in part, on observed durations of different classes of acoustic events. Such systems can include models approximating probability distributions of duration for various classes of acoustic activities. For example, training data representative of various types of acoustic activities can tune statistical models of duration, probabilistically correlating acoustic-scene classifications to observed acoustic features and event durations. Consequently, disclosed acoustic-scene interpretation systems can accurately classify acoustic scenes in real time with relatively low computational overhead.

Figure 1:
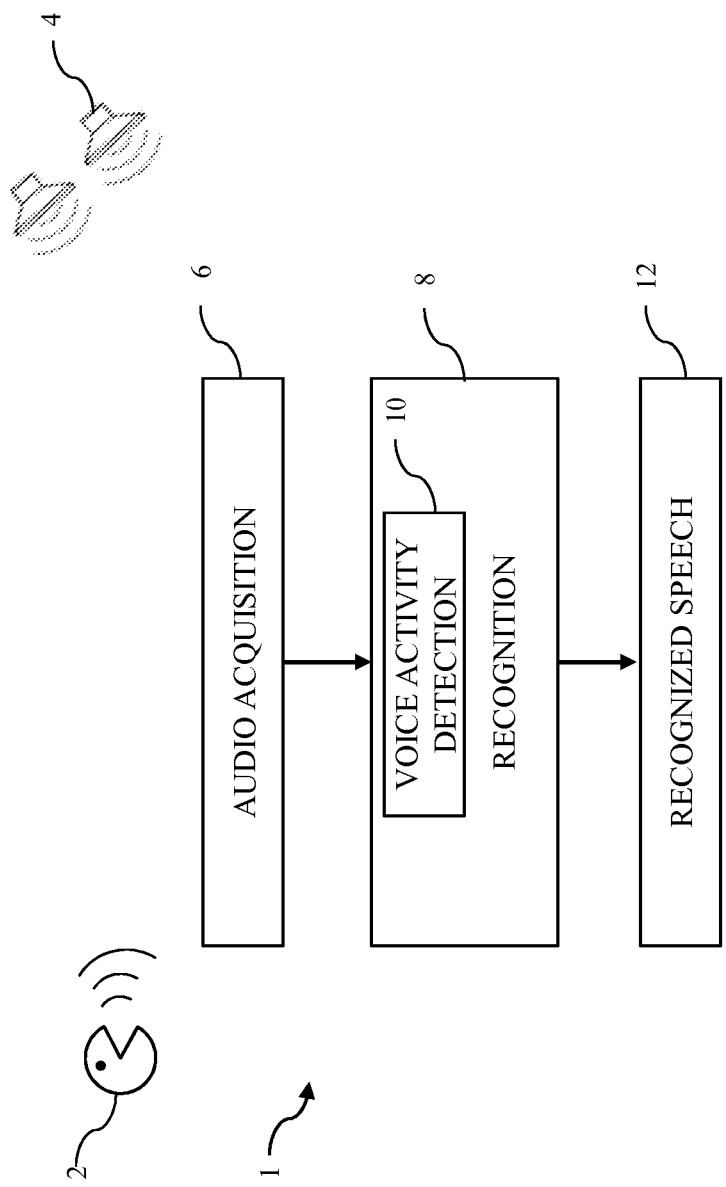
FIG. 1 shows a schematic block diagram of an exemplary acoustic-scene interpretation apparatus in the form of an automatic speech recognition (ASR) apparatus.

FIG. 1 schematically depicts one particular example of such an acoustic-scene interpretation apparatus in context of automatic speech recognition, sometimes referred to in the art as "ASR". The ASR system 10 can automatically transcribe human speech, or an utterance, even when the speech signal 1 suffers one or more forms of impairment 2 (e.g., background noise and/or reverberation).

More particularly, the illustrated ASR system has an acoustic acquisition module 6, a recognition module 8 and a transcription module 12. The recognition module 8 has an acoustic-scene classifier 10, in this instance embodied as a so-called voice-activity detector, configured to discriminate between intended acoustic signals (e.g., signals dominated by an utterance) and other classes of signal (e.g., signals dominated by music, background noise or other speech-signal impairment).

In disclosed systems, the classifier 15 infers, or decodes, activity hypotheses from signal-processing features derived from an observed acoustic signal. In some classifier embodiments, a variation of a known Viterbi technique is applied to model event duration for various classes of acoustic events. Such an approach permits the inference to be data-driven based on observed training data. Consequently, disclosed systems can reflect realistic, or more accurate, timing patterns (e.g., distributions of event duration) for many different classes of acoustic signals, providing improved accuracy and thus efficiency over previously proposed acoustic-scene classifiers. Moreover, disclosed apparatus can discriminate between or among several classes of acoustic scene, often in real time.

By virtue of such discrimination, the recognition engine 8 and the transcription module 12 can be selectively activated to attempt to recognize and transcribe utterances only from signals dominated by, for example, utterances (or other desired class of acoustic activity) and can ignore or differently process other signals dominated by other classes of acoustic activity, for example, music. For example, operation of the transcription module 12 can be deferred until a cessation of speech is detected by the inference module 10, or operation of the transcription module can be instituted upon detection of a speech-dominated signal by the inference module. In the illustrated ASR embodiment, the transcription module 12 outputs recognized speech.

As used herein, the phrase "recognized speech" means an output from an automated speech recognition system. Often, but not exclusively, recognized speech can be output in response to a detected human utterance. As several examples among many, recognized speech can include an automatically generated transcription of a human-intelligible expression of a concept. Such a transcription can be in the form of text, sound, imagery, a three-dimensional item, as from a so-called "3-D printer," a data structure or data, or a machine-executable instruction that, when executed, causes a special-purpose or a general-purpose computing environment to perform a selected method (e.g., set a temperature on a thermostat, to turn lights on or off, or any of myriad other machine-implemented methods now known or hereafter developed. The foregoing examples of recognized speech are illustrative only and non-limiting. Other examples of recognized speech will be readily apparent to those of ordinary skill in the art following a review of this disclosure.

And, although the foregoing overview of classification and other principles is presented in a context of ASR systems, such principles apply to classes of acoustic scenes other than human speech. For example, a given classifier 100 (FIG. 2) can be trained to identify a variety of classes of acoustic scenes, with vehicle traffic or animal activity being particular examples among many possible examples of classes of acoustic scenes.

Additionally, acoustic-scene interpretation systems having an acoustic-scene classifier can be configured to perform one or more acts and/or to provide one or more selected forms of output (e.g., other than recognized speech) corresponding to the selected classes and/or states of acoustic scenes that the classifier 100 is trained to identify.

Figure 2:
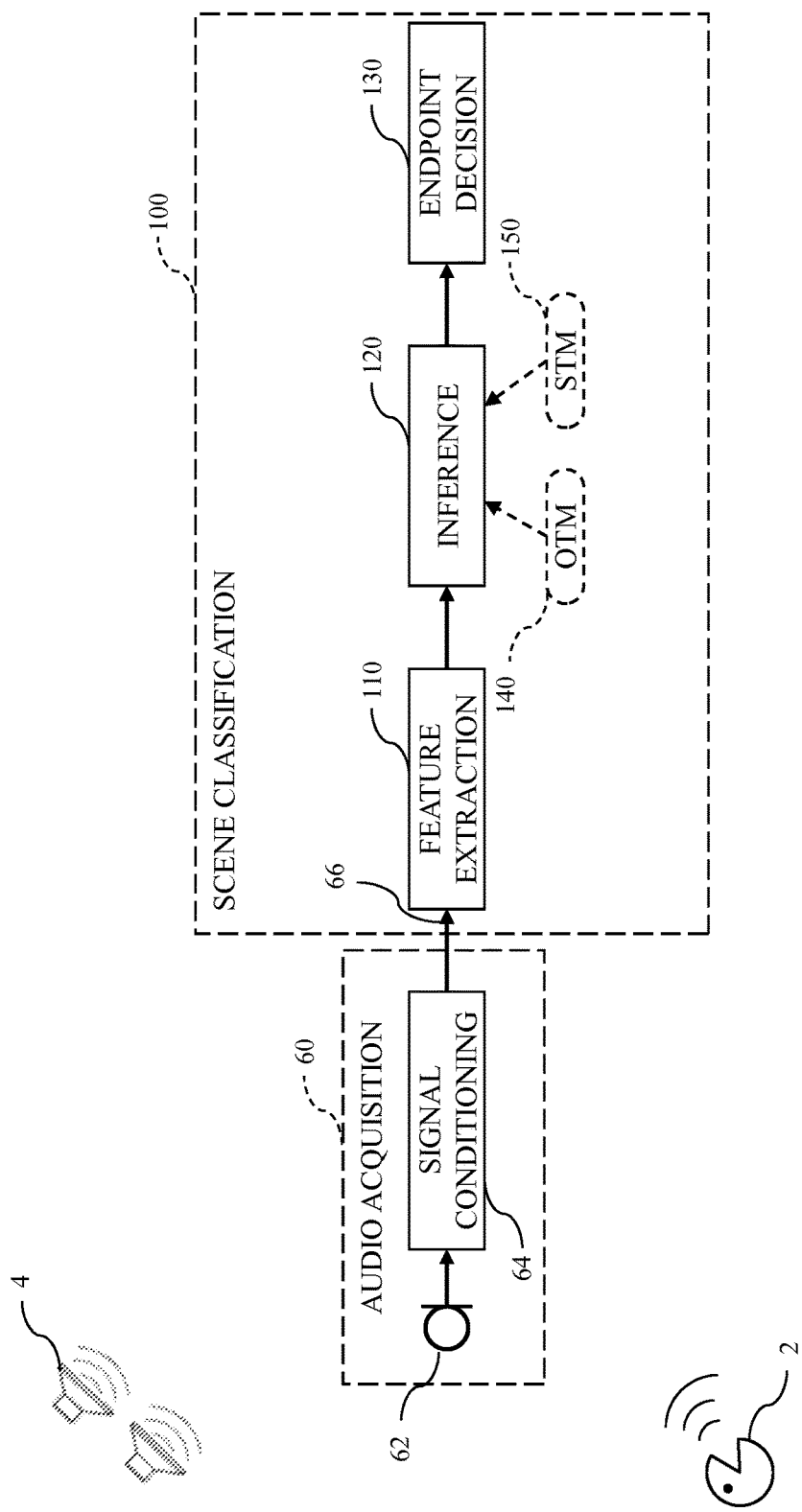
FIG. 2 shows a schematic block diagram of a scene classification module suitable for use in the ASR system depicted in FIG. 1.

Representative aspects of disclosed acoustic-scene classifiers are described by way of reference to the scene classifier 100 depicted in FIG. 2. The representative acoustic-scene classifier 100 has three primary functional blocks: an acoustic-feature extractor (e.g., a signal processor) 110, an inference module 120 (e.g., to generate hypotheses regarding one or more observed acoustic-scenes based on extracted parameters and duration models), and an end-point decision module 130 (e.g., to apply heuristic or other "corrections" to the output from the inference module). An observation transition model 140 (sometimes referred to in the art as "OTM") and/or a state transition model 150 (sometimes referred to in the art as "STM") can inform processing performed by the inference engine 120. Parameters for the OTM and STM can be established during offline training with acoustic signals emanated from various classes of acoustic scenes.

Disclosed inference modules generally provide improved inference results by virtue of their ability to account for accurate event-duration probabilities and up-front training using data from each of several selected classes of acoustic-scenes. This in turn allows acoustic-scene interpretation systems to rely less on the heuristic layer and therefore provide real-time classification of acoustic scenes.

II. AUDIO ACQUISITION

Like a voice-activity-detector 10 depicted in FIG. 1, a scene classifier 100 can receive a representation 66 of an acoustic signal acquired by a corresponding audio acquisition module 60 having an acoustic transducer 62 (e.g., a microphone, colloquially referred to as a "mic" or "mike").

As used herein, the phrase "acoustic transducer" means an acoustic-to-electric transducer or sensor that converts an observed acoustic signal, or sound, into a corresponding electrical signal representative of the acoustic signal. Although a single microphone is depicted in FIG. 2, the use of plural microphones is contemplated by this disclosure. For example, plural microphones can be used to obtain plural distinct acoustic signals emanating from a given acoustic scene, and the plural versions can be processed independently or combined before further processing.

The audio acquisition module 60 can also include a signal conditioner 64 to filter or otherwise condition the acquired representation of the acoustic signal. For example, after recording and before presenting a representation of the observed acoustic signal to the recognition engine 8 (FIG.

1), characteristics of the observed acoustic signal (including any impairment signals) can be manipulated. Such manipulation can be applied to a representation of the observed acoustic signal (sometimes referred to in the art as a "stream") by one or more echo cancelers, echo-suppressors, noise-suppressors, de-reverberation techniques, linear-filters (EQs), and combinations thereof. As but one example, an equalizer can equalize the stream, e.g., to provide a uniform frequency response, as between about 150 Hz and about 8,000 Hz.

The conditioned output 66 from the audio acquisition module 60 can be conveyed to the scene classifier 100.

III. FEATURE EXTRACTION

Nonetheless, the characteristics of a recorded signal emanating from a given acoustic scene can arise from a variety of different sources and can be influenced by a number of impairments (e.g., reverberation, other acoustic sources, etc.), none of which is necessarily quantifiable or predictable a priori, or even controllable.

Disclosed scene-interpretation systems address those and other difficulties by classifying acoustic scenes according to observed acoustic features and event-duration information from models tuned with training data classified according to type of acoustic scene. Once an observed acoustic scene has been classified, a representation of the corresponding acoustic signal can be selectively processed further using techniques known to be suitable for the corresponding class to which the signal has been assigned.

As depicted in FIG. 2, the feature extraction engine 110 is first in the chain of modules in the scene classifier 100. An extraction processor can be configured to extract selected acoustic features (e.g., triphones and associated statistics), indicated by the dashed box labeled "Feature Select," from the incoming stream 66. Such extraction can be performed using known approaches.

For each incoming buffer 66 of audio samples, the feature extraction module 110 can determine a single M-dimensional vector Y (e.g., indicated by block 117 in FIG. 3) of acoustic features. Each element of the vector Y can correspond to the value computed for a respective one of the M acoustic features.

Figure 3:
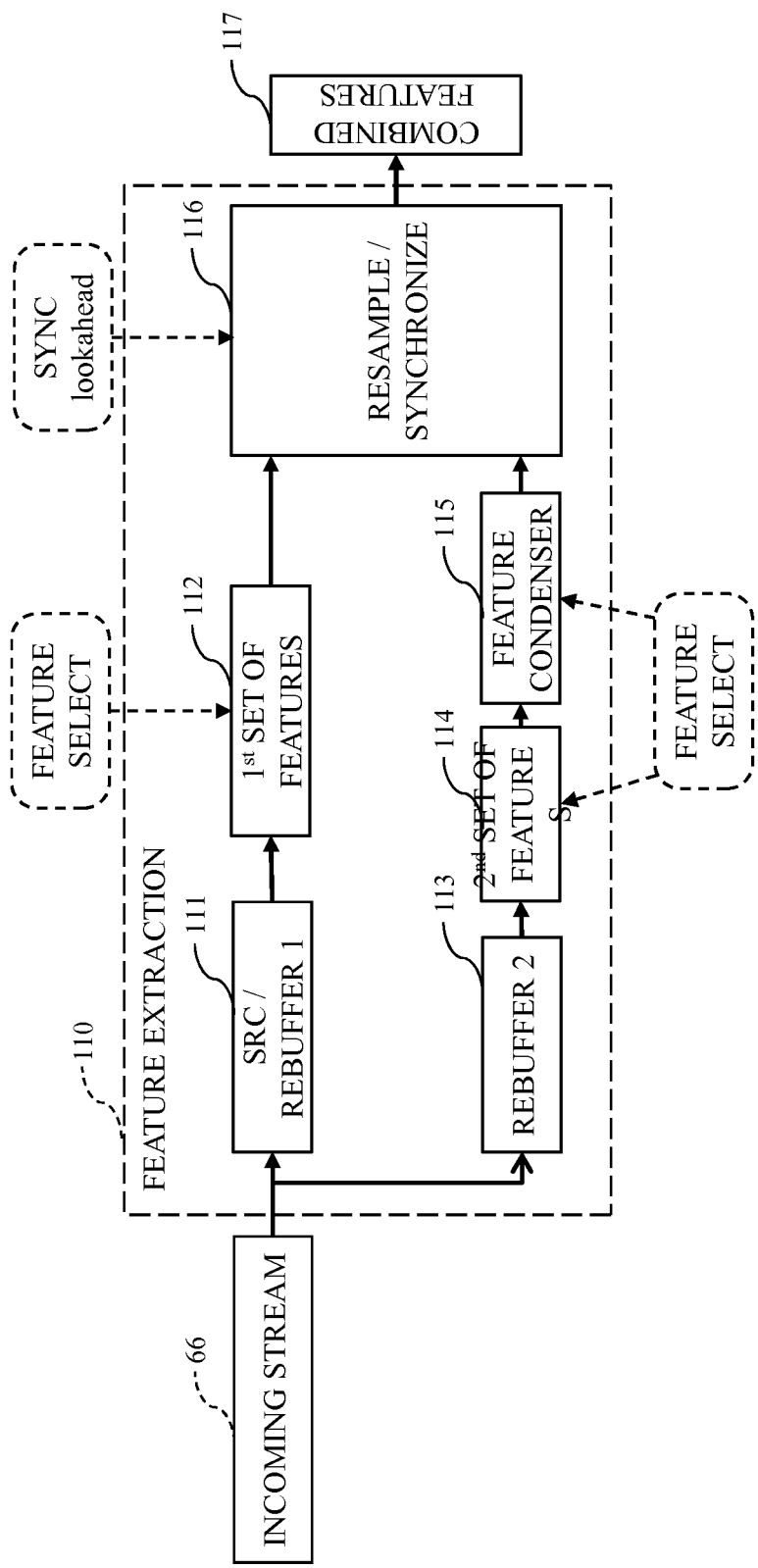
FIG. 3 shows a schematic block diagram of the acoustic feature extraction module depicted in FIG. 2.

As blocks 112, 114 in FIG. 3 indicate, features may be calculated at one or more different buffer-rates 111, 113. As one example, a first sampling-rate-converter 111 (sometimes referred to as an "SRC") can up- or down-sample the incoming stream 66 (e.g., to about a 16,000 Hz output) to a first selected sampling rate, e.g., to achieve a desired computational efficiency. A first set of acoustic features can be extracted from the first rebuffered stream by a corresponding first extraction processor 112. In some working embodiments, the first extraction processor 112 extracts one or more non-stationarity and/or linear-prediction features.

Similarly, a second set of acoustic features can be extracted from a second rebuffered stream by a corresponding second extraction processor 114. Subsequently, a resample/synchronization operation 116 can be applied to the first and the second rebuffered streams to resynchronize them prior to assembling the final vector Y at block 117.

Each selected feature extracted by the extraction processors 112, 114 can be designed to quantify a corresponding, preferably independent and unique, aspect of the incoming audio representation 66. Taken altogether, the ensemble 117 of representative features $Y_t$ can generate concise patterns by which the inference module 120 (FIGS. 2 and 4) is able to identify different modes of activity.

Several representative examples of possible signal processing features are listed below:

| | |
|---|---|
| Nonstationarity based on spectral minimum-tracking | Modulation spectral energy |
| | Harmonic consistency |
| Linear prediction residual sparsity | Low-energy fraction |
| Linear prediction residual autocorrelation | Variance of spectral rolloff frequency |
| Chromagram analysis | Variance of spectral centroid |
| Beat detection using modulation frequency analysis | Variance of spectral flux |
| | Variance of spectral reconstruction difference |
| Filtered RMS | |
| Filtered RMS derivative | Liftered cepstral sparsity |
| RMS dynamic range | Variance of liftered cepstrum |
| Normalized RMS variance | Average pitch density |
| Log RMS standard deviation | Average power of pitched frames |

To reduce a dimensionality of the resultant feature vector Y generated at block 117, a selected group of features (e.g., the last 18 features) can be combined into so-called "super-features" through linear discriminant analysis (LDA), as by a condensation processor 115 (FIG. 3). For each respective pair of potential activity classes, a corresponding optimal linear discriminant from the selected group of features can be identified. For a three-class example of Speech, Music, and Silence, three super-features can be identified and classified according to Speech/Music, Speech/Silence, and Music/Silence. Each super-feature can simply be a different linear combination of the constituent extracted features, and can be based on their correlations to the selected classes of acoustic activity.

IV. INFERENCE

Figure 4:
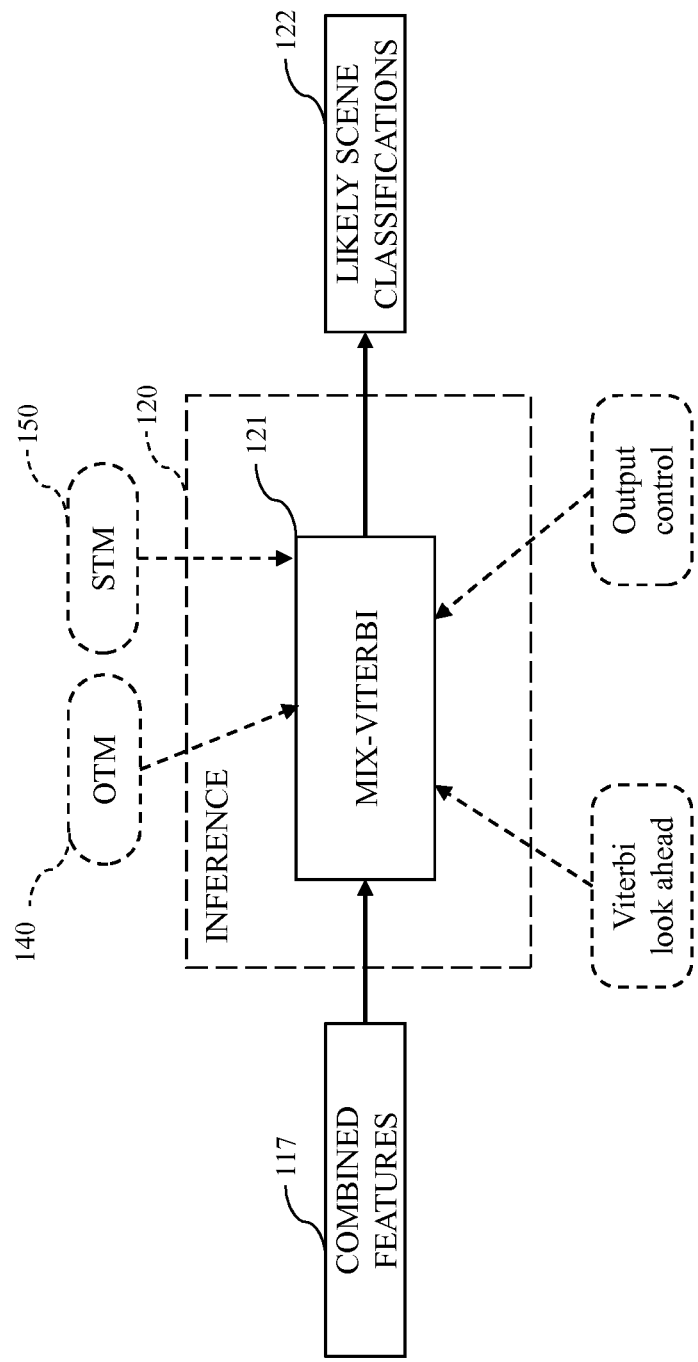
FIG. 4 shows a schematic block diagram of the inference module depicted in FIG. 2.

Referring again to FIG. 2, as well as to FIG. 4, the inference engine 120 receives the vector time series $Y_t$ as input from block 117. The inference engine 120 can determine a likely scene classification 122 that can be delivered to an interpretation engine, with the recognition engine 80 depicted in FIG. 1 being but one possible example of an interpretation engine. For example, disclosed inference engines 120 can apply innovative signal processing techniques (e.g., referred to herein generally as Mix Viterbi) to decode a likely state of the acoustic scene giving rise to an observed, incoming acoustic signal.

In some instances, the inference engine 120 can be configured for an upper-bound latency or "lookahead" d, which allows the Mix Viterbi engine 121 to update its estimate for time t=T−d based on a full sequence $Y_{1:T}$. The model parameters, including event-duration model parameters, can be calculated offline during a system training phase.

In contrast to conventional Viterbi inference engines for Hidden Markov Models (HMMs), which assume a simplistic first-order event timing model, disclosed Mix Viterbi inference techniques more realistically model event durations and provide a substantially more powerful approach for accurately estimating when audio events occur and for how long. An immediate benefit of disclosed approaches over conventional systems is a reduction in short-lived "false detections" indicating a change in an acoustic scene, when in fact no such change has actually occurred. Disclosed systems recognize such short-lived events to be improbable based on the more accurate event duration models (e.g., the observed transition model (OTM) 140 and state transition model (STM) 150 depicted in FIG. 4), and corresponding data-driven training of those models.

A. Event Duration Models

Let $S_t=1$ denote an 'on' state and $S_t=0$ denote an 'off' state. For instance, in connection with a speech event, $S_t=1$ while a person is speaking and $S_t=0$ otherwise.

Figure 5:
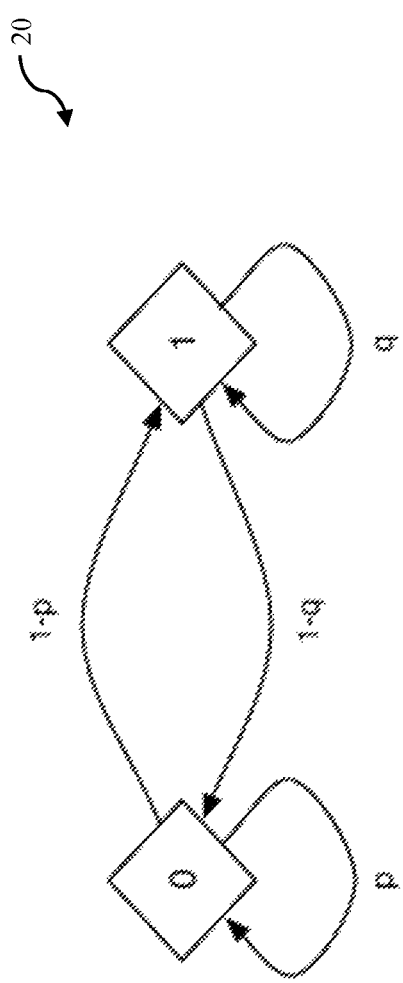
FIG. 5 shows a diagram of a first-order state-transition model for a selected class of acoustic scenes. The first-order state-transition model is independent of duration of a given acoustic event.

Equation (1) models a first-order Markov model as depicted by the state-transition diagram 20 shown in FIG. 5, $P(S_{t+1}|S_t)$.

$$P(T_1=t)=q^{t-1}(1-q) \quad \text{Equation (1)}$$

Figure 6:
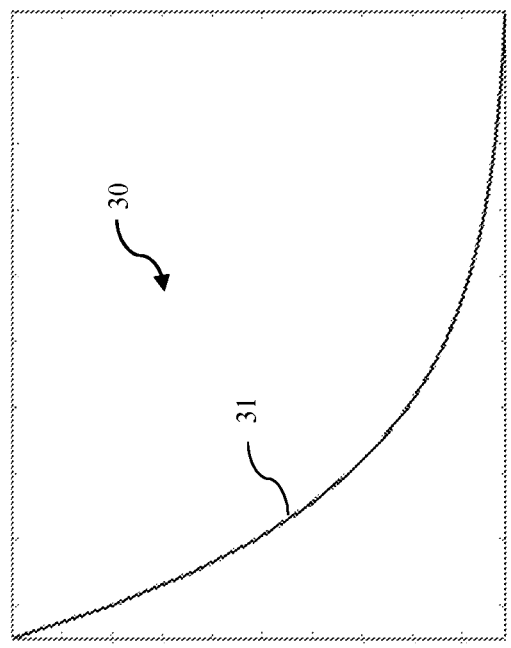
FIG. 6 shows a probability distribution for a given state's duration corresponding to the state-transition model shown in FIG. 5. As FIG. 6 shows, the state-transition model depicted in FIG. 5 provides a geometric distribution of state probability when measured against state duration.

The corresponding event duration times $T_1$ (curve 31) are geometrically distributed, as indicated by the probability distribution function 30 depicted in FIG. 6. The shape of that distribution 30 contrasts with the distribution 40 of duration times depicted in FIG. 7.

Figure 7:
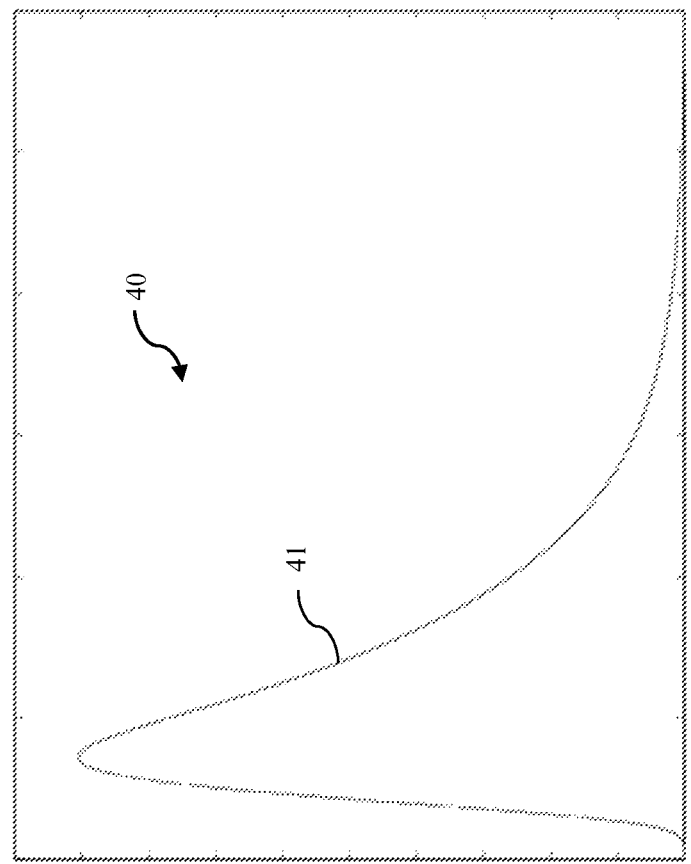
FIG. 7 shows a plot of a probability distribution function for a class of acoustic scenes whose state corresponds in part on duration of a given acoustic event.

The plot 40 in FIG. 7 represents an actual distribution of speech event duration times (curve 41), showing that events having extremely short times have low probability, in direct contrast with the geometric distribution 31. With equal mean event durations, the geometric distribution 31 places a much higher prior probability on short event times than actually occurs in practice, which is reflected by the distribution 41.

By Bayes' rule, Equation (2), accurately modeling event times can reduce erroneous or false detections of short duration events or changes in state that are unlikely in view of prior events.

$$P(S_{1:N}|Y_{1:N}) \propto P(S_{1:N})P(Y_{1:N}|S_{1:N}) \quad \text{Equation (2)}$$

Stated differently, since lowering a prior probability of specific events also lowers the posterior probability of such events given acoustic features $Y_{1:N}$ (indicating a given likelihood of an event) extracted from the buffered stream of the acoustic signal. Consequently, by reflecting the distribution of event durations more accurately, an inference engine 120 can run at relatively more sensitive thresholds and respond with lower latency to true events without risking as many spurious detections as previously proposed inference engines.

As explained more fully below, the inventors discovered an approach for more accurately modeling, in real time, actual distributions of event duration for selected classes of acoustic scenes. Disclosed approaches are lacking from previously proposed inference engines.

B. Approximate Mix-Viterbi Inference

Figure 8:
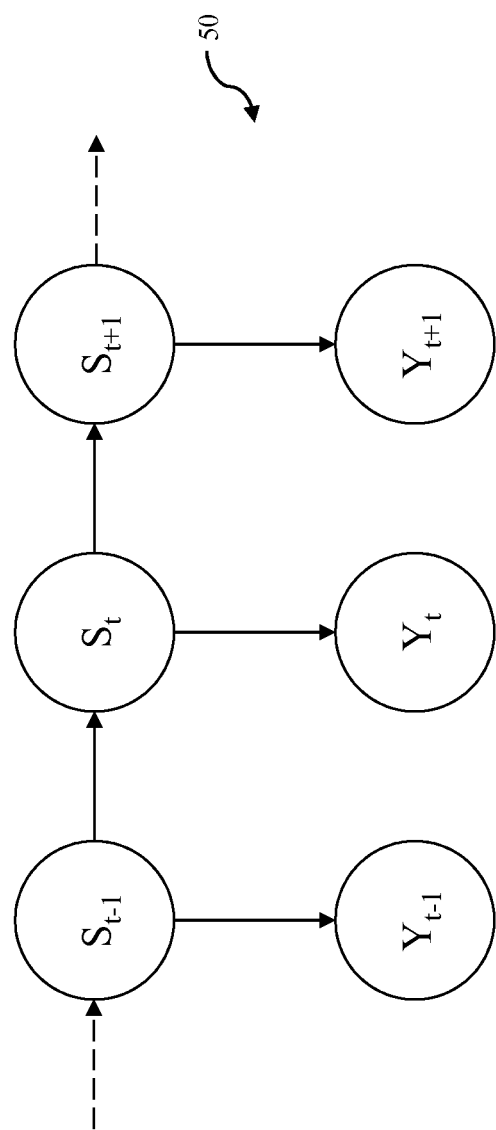
FIG. 8 shows a diagram of a dynamic Bayesian network reflecting the first-order state-transition model shown in FIG. 5.

In particular, disclosed approaches introduce an additional, hidden layer $\tau_t$ (e.g., depicted in the Bayesian network 60 shown in FIG. 9) in contrast to earlier approaches based on a single hidden layer $S_t$ (e.g., depicted in the Bayesian network 50 shown in FIG. 8). Disclosed approaches model the joint evolution of $S_t$ and $\tau_t$ according to the higher-order state-transition model depicted in FIG. 10.

However, as the inventors recognized, the internal duration model states $\tau_t$ are not themselves of interest, only the event state $S_t$. Accordingly, the conventional Viterbi inference objective $$S_{1:N}^* \overset{\Delta}{=} \underset{S_{1:N}}{\operatorname{argmax}} P(S_{1:N}|Y_{1:N})$$

can be written as shown in Equation (3):

$$= \underset{S_{1:N}}{\operatorname{argmax}} \int_{\tau_{1:N}} P(S_{1:N},\tau_{1:N}|Y_{1:N}) d\tau_{1:N} \quad \text{Equation (3)}$$

However, computing Equation (3) is difficult because maximization and integration cannot be interchanged. The exact computation of Equation (3) has exponential-time complexity in the number of frames and thus cannot be implemented in real time.

Nonetheless, approximating Equation (3) to resolve the evolution of $S_t$ can improve overall accuracy of the inference engine 120, even though duration states $\tau_t$ are not directly computed. Rather, the duration states can be (approximately) integrated out, in stark contrast to conventional systems that attempted to address duration through the heuristic layer 130 or through direct computation. Under one disclosed approach, three additional (e.g., "long-term") conditional independence assumptions can be applied to obtain a suitable approximate recursive inference using constant-time updates. That approach allows computations similar to the original Viterbi approach, while still accounting for more realistic probability distributions of event duration.

By way of summary, disclosed inference engines 120 can implement an innovative computational approach (referred to herein as "Mix-Viterbi") involving the following computations:

1. Apply a modified forward computation to determine $P(\tau_t,\tau_{t+1},S_t,S_{t+1}|Y_{1:t})$;
2. Sum the foregoing over $\tau_{t:t+1}$-states and apply Bayes' rule to solve for each local transition distribution: $P(S_{t+1}|S_t,Y_{1:t})$;
3. Substitute $P(S_{t+1}|S_t,Y_{1:t})$, determined above, for the first-order Markov model of $P(S_{t+1}|S_t)$ in a conventional Viterbi computation (referred to herein as a "Mix Viterbi Approximation").

1. Modified Forward Computation

Figure 9:
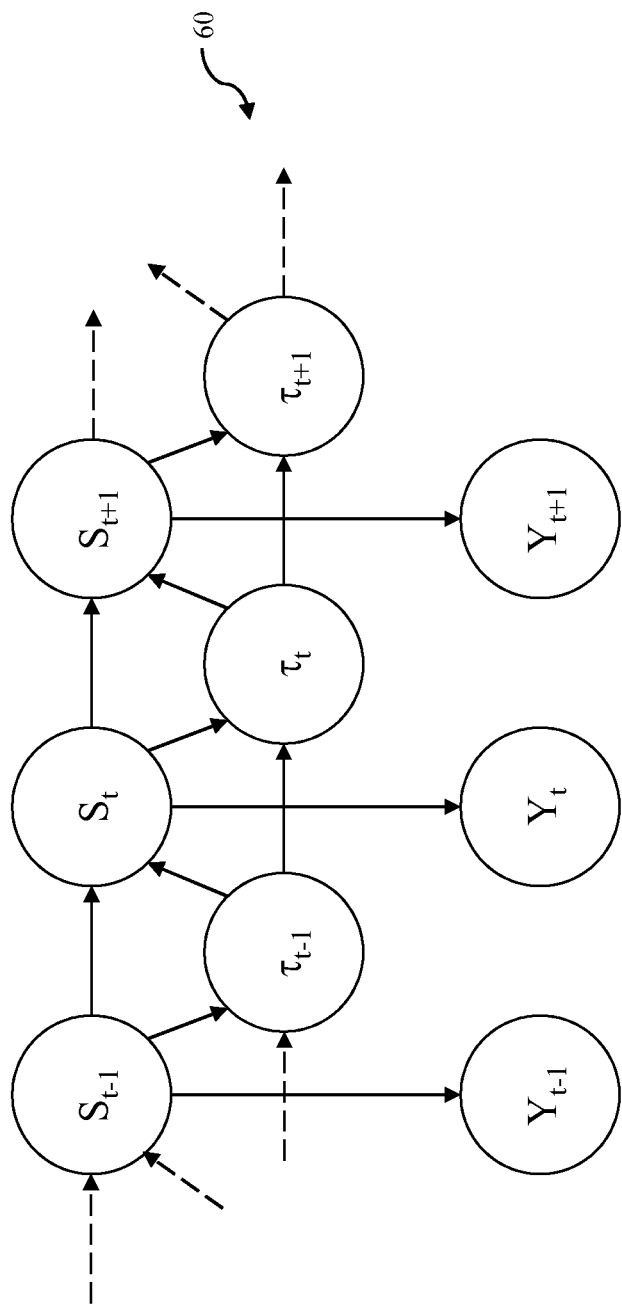
FIG. 9 shows a diagram of a dynamic Bayesian network incorporating an event-duration model.
Figure 10:
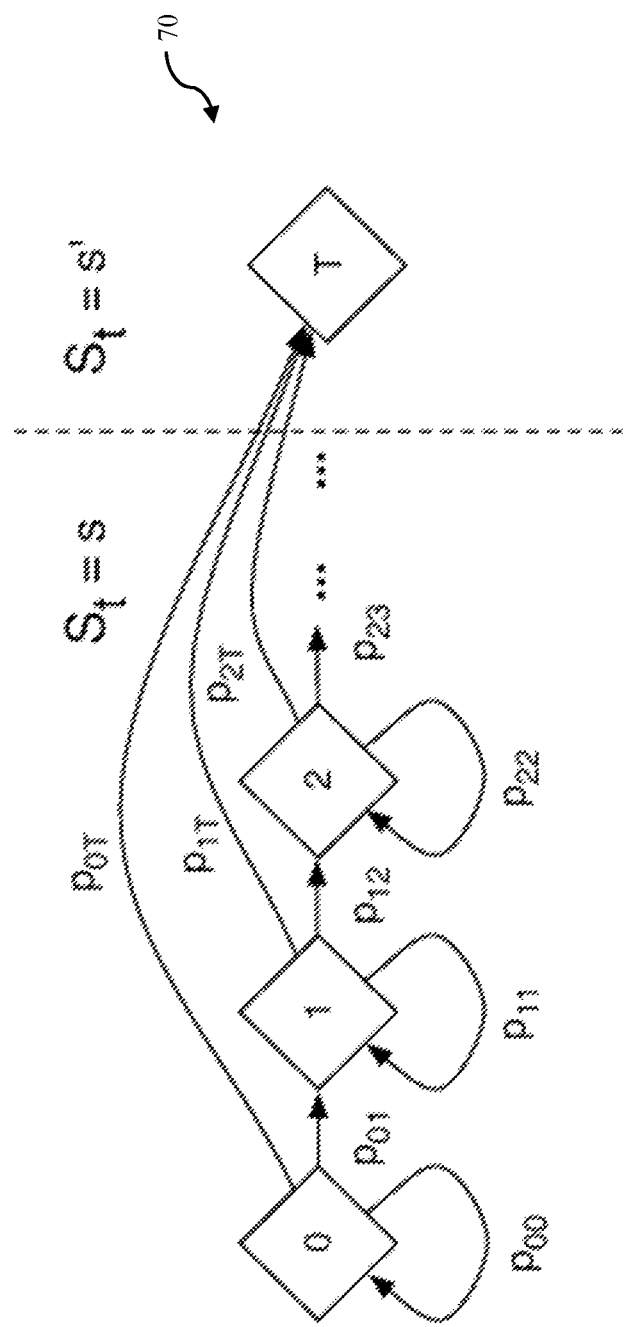
FIG. 10 shows a diagram of a higher-order state-transition model (sometimes referred to in the at as an "STM") for a selected class of acoustic scenes. The higher-order model reflects event duration insofar as a likelihood of a given state at a particular time depends in part on states at earlier times.

The "modified forward computation" to determine $P(\tau_t,\tau_{t+1},S_t,S_{t+1}|Y_{1:t})$ can be derived as follows. Let $P(S_0)$ be a prior probability, obtained from a stationary distribution of $P(\tau_{t+1},S_{t+1}|\tau_t,S_t)$ as depicted in FIGS. 9 and 10. The initial step, $P(\tau_0,\tau_1,S_0,S_1)$, can be obtained from the dependences depicted in FIG. 9, and written as follows:

$$P(\tau_0,\tau_1,S_0,S_1)=P(S_0)P(\tau_0|S_0)P(S_1|S_0,\tau_0)P(\tau_1|\tau_0,S_1) \quad \text{Equation (4)}$$

For inductive-reasoning purposes, let the desired quantity from the previous iteration, $P(\tau_{t-1},\tau_t,S_{t-1},S_t|Y_{1:t-1})$, be known. Then Equation (5)

$$\begin{aligned}
P(\tau_t, \tau_{t+1}, S_t, S_{t+1} | Y_{1:t}) &= P(\tau_t, S_t | Y_{1:t})P(\tau_{t+1}, S_{t+1} | \tau_t, S_t) \\
&= P(\tau_t, S_t | Y_{1:t})P(S_{t+1} | S_t, \tau_t)P(\tau_{t+1} | \tau_t, S_{t+1}) \\
&\propto P(Y_t | S_t)P(\tau_t, S_t | Y_{1:t-1}) \\
&\quad P(S_{t+1} | S_t, \tau_t)P(\tau_{t+1} | \tau_t, S_{t+1}) \\
&= P(Y_t | S_t)\left[\sum_{\tau_{t-1},S_{t-1}} P(\tau_{t-1}, \tau_t, S_{t-1}, S_t | Y_{1:t-1})\right] \times \\
&\quad P(S_{t+1} | S_t, \tau_t)P(\tau_{t+1} | \tau_t, S_{t+1})
\end{aligned}$$

The proportionality reflected in the derivation above can be addressed by computing the quantity from Equation (5) and renormalizing both sides so the result sums to unity over $\tau_t,\tau_{t+1},S_t,S_{t+1}$.

2. Sum Over $\tau_{t:t+1}$-States/Apply Bayes' Rule

The local transition distribution can be determined according to the following:

$$P(S_{t+1} \mid S_t, Y_{1:t}) \propto P(S_t, S_{t+1} \mid Y_{1:t}) \quad \text{Equation (6)}$$
$$= \sum_{\tau_{t-1}, \tau_t} P(\tau_t, \tau_{t+1}, S_t, S_{t+1} \mid Y_{1:t})$$

3. Mix Viterbi Approximation

For the third computation, which contains the above-referenced approximation of Equation (3), the goal is to compute a maximum a posteriori state trajectory, $S^*_{1:T}$ given all available observations:

$$S^*_{1:T} = \underset{S_{1:T}}{\operatorname{argmax}} P(S_{1:T} \mid Y_{1:T}) \quad \text{Equation (7)}$$

Defining $$J(S_t, t) = \max_{S_{1:t-1}} P(S_{1:t} \mid Y_{1:T}),$$

then $$J(S_{t+1}, t+1) \approx P(Y_{t+1} \mid S_{t+1}) \max_{S_t} \left[ P(S_{t+1} \mid S_t, Y_{1:t}) J(S_t, t) \right] \quad \text{Equation (8)}$$

In Equation (8), $P(S_{t+1} \mid S_t, Y_{1:t})$, computed in Equation (6), is substituted in place of $P(S_{t+1} \mid S_t)$ in a conventional (i.e., two-layer, as in FIG. 8) Viterbi computation.

A conventional Viterbi calculation cannot be used directly, as the imposition of the $\tau_t$ layer (FIG. 9) destroys the implied Markov (e.g., conditional independence) assumptions. Applying the conventional Viterbi approach would result in applying the geometric event duration model (FIGS. 5 and 6) which defeats the purpose of modeling duration states.

C. Validation and Complexity

On short runs, the approximated Mix-Viterbi inference has produced substantially identical results compared to the exact solution of Equation (3). Alternative approaches (e.g., joint maximization and joint integration) have been explored and yield results less accurate than the Mix Viterbi approach described above, as compared to the exact solution of Equation (3).

As the cardinality of $\tau_t$ becomes infinite, any event duration distribution can be modeled.

Practically speaking, however, a relatively small number of $\tau_t$-states (e.g., between about 2 and about 8, with between about 3 and about 6 being a particular example) can suffice to achieve desirably accurate results.

Figure 11:
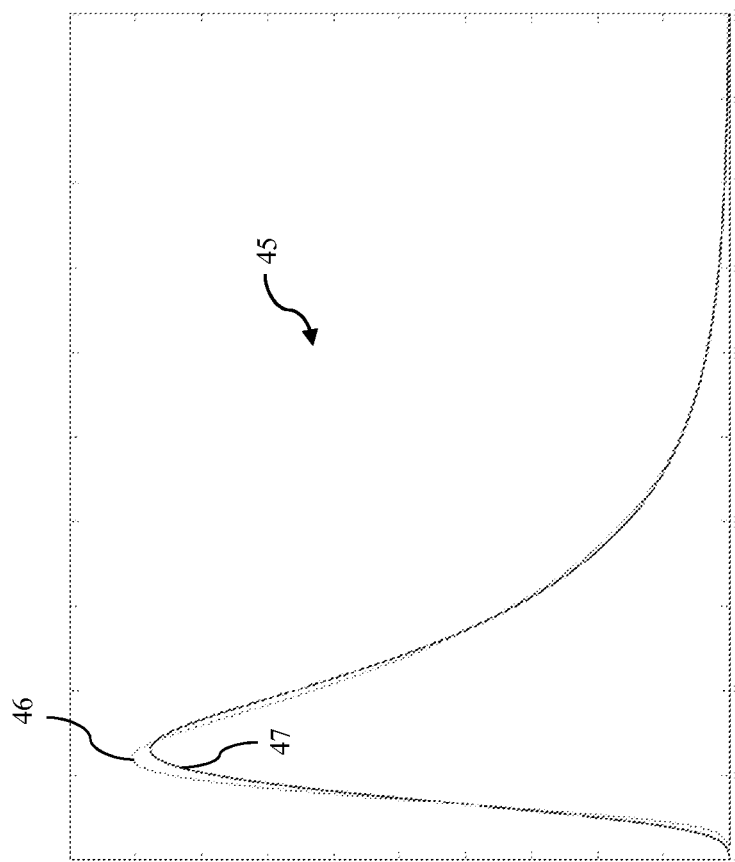
FIG. 11 shows a plot of distribution of state-duration probabilities resulting from a $5^{th}$ order state-transition model as depicted in FIG. 10 compared to an observed distribution of event durations for actual speech.

According to one working embodiment, the parameters of a selected event duration model were determined by an initial Metropolis-Hastings randomized search followed by gradient descent, minimizing a Kullback-Leibler distance between the resultant and target duration distributions. FIG. 11 shows the duration distribution output 45 of an order-5 model 47 designed to reproduce an actual speech event distribution 46 learned from duration training data based on a mixture-Gaussian fit.

Letting S be the cardinality of $S_t$, T be the cardinality of $\tau_t$, the complexity of Mix-Viterbi is $O(S^2T^2)$, dominated by forward-algorithm updates, as opposed to $O(S^2)$ for conventional Viterbi computations.

A working embodiment of a disclosed inference engine 120 was implemented on an embedded platform, with S=4, T=5. When the working embodiment was applied to acoustic signals to discriminate between music and speech, the highest observed fraction of CPU computations was 2% of the total CPU computations for the entire detection engine. The remaining 98% of CPU computations were allocated between overhead computations and computations to extract acoustic features. Thus, disclosed inference engines are expected to impose little additional computational overhead and yet are believed to result in substantially improved classification accuracy and overall efficiency of acoustic-scene interpretation.

V. COMPUTING ENVIRONMENTS

Figure 12:
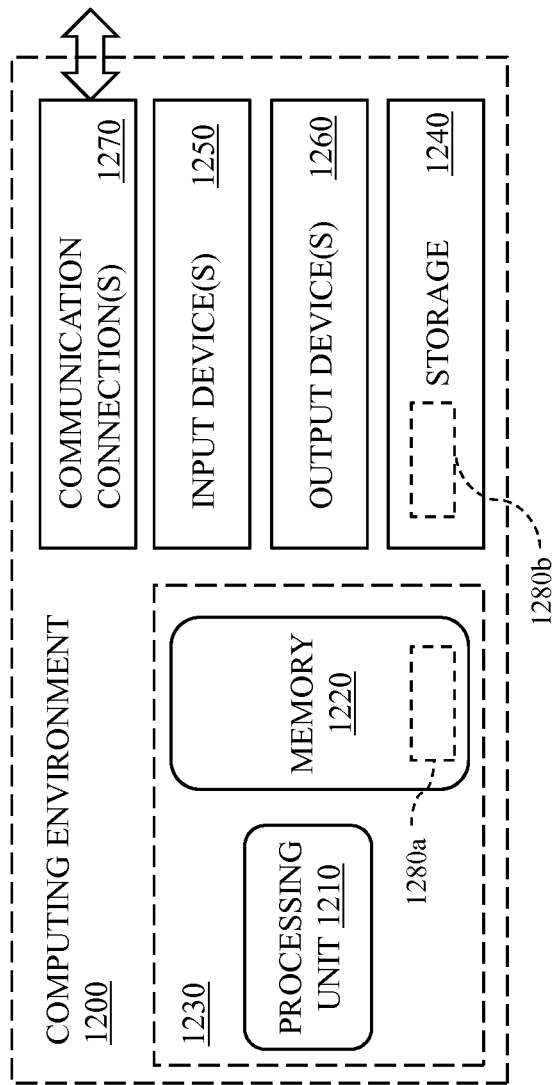
FIG. 12 shows a schematic illustration of a computing environment suitable for implementing one or more technologies disclosed herein.

FIG. 12 illustrates a generalized example of a suitable computing environment 1200 in which described methods, embodiments, techniques, and technologies relating, for example, to acoustic-scene interpretation can be implemented. The computing environment 1200 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and handheld devices (e.g., a mobile-communications device, or, more particularly but not exclusively, IPHONE®/IPAD® devices, available from Apple Inc. of Cupertino, Calif.), multiprocessor systems, microprocessor-based or programmable consumer electronics, embedded platforms, network computers, minicomputers, mainframe computers, smartphones, tablet computers, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 1200 includes at least one central processing unit 1210 and memory 1220. In FIG. 12, this most basic configuration 1230 is included within a dashed line. The central processing unit 1210 executes computer-executable instructions and may be a real or a virtual processor. In a multi-processing system, multiple processing units execute computer-executable instructions to increase processing power and as such, multiple processors can run simultaneously. The memory 1220 may be volatile memory (e.g., registers, cache, RAM), non-volatile memory (e.g., ROM, EEPROM, flash memory, etc.), or some combination of the two. The memory 1220 stores software 1280a that can, for example, implement one or more of the innovative technologies described herein, when executed by a processor.

A computing environment may have additional features. For example, the computing environment 1200 includes storage 1240, one or more input devices 1250, one or more output devices 1260, and one or more communication connections 1270. An interconnection mechanism (not shown) such as a bus, a controller, or a network, interconnects the components of the computing environment 1200. Typically, operating system software (not shown) provides an operating environment for other software executing in the computing environment 1200, and coordinates activities of the components of the computing environment 1200.

The store 1240 may be removable or non-removable, and can include selected forms of machine-readable media. In general machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 1200. The storage 1240 stores instructions for the software 1280, which can implement technologies described herein.

The store 1240 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 1250 may be a touch input device, such as a keyboard, keypad, mouse, pen, touchscreen, touch pad, or trackball, a voice input device, a scanning device, or another device, that provides input to the computing environment 1200. For audio, the input device(s) 1250 may include a microphone or other transducer (e.g., a sound card or similar device that accepts audio input in analog or digital form), or a computer-readable media reader that provides audio samples to the computing environment 1200. The output device(s) 1260 may be a display, printer, speaker, CD-writer, or another device that provides output from the computing environment 1200.

The communication connection(s) 1270 enable communication over a communication medium (e.g., a connecting network) to another computing entity. The communication medium conveys information such as computer-executable instructions, compressed graphics information, or other data in a modulated data signal.

Tangible machine-readable media are any available, tangible media that can be accessed within a computing environment 1200. By way of example, and not limitation, with the computing environment 1200, computer-readable media include memory 1220, storage 1240, communication media (not shown), and combinations of any of the above. Tangible computer-readable media exclude transitory signals.

V. OTHER EMBODIMENTS

The examples described above generally concern acoustic-scene interpretation apparatus and related systems, and some include an inference engine configured to classify acoustic scenes, in part, by accurately modeling distributions of duration for various classes of acoustic events. Nonetheless, embodiments other than those described above in detail are contemplated based on the principles disclosed herein, together with any attendant changes in configurations of the respective apparatus described herein.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of signal processing techniques that can be devised using the various concepts described herein.

Moreover, those of ordinary skill in the art will appreciate that the exemplary embodiments disclosed herein can be adapted to various configurations and/or uses without departing from the disclosed principles. Applying the principles disclosed herein, it is possible to provide a wide variety of systems adapted to interpret acoustic scenes based on observed acoustic signals. For example, modules identified as constituting a portion of a given computational engine in the above description or in the drawings can be omitted altogether or implemented as a portion of a different computational engine without departing from some disclosed principles. Moreover, acoustic scenes other than speech, music, silence, vehicle traffic and animal activity can be interpreted using principles disclosed herein.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the features and method acts of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We currently claim:
1. An acoustic-scene interpretation apparatus, comprising:
   a transducer configured to convert an incoming acoustic signal to a corresponding electrical signal;
   an acoustic-feature extractor configured to receive a representation of the corresponding electrical signal comprising a sequence of frames and to extract a plurality of acoustic features corresponding to each respective frame;

an acoustic-scene classifier configured to determine a most-likely acoustic state for each current frame in the sequence of frames in correspondence with the plurality of acoustic features corresponding to a current frame and a selected probability distribution of duration of an acoustic state for each of one or more classes of acoustic scenes; and a recognition engine configured to determine a transcription of the incoming acoustic signal in at least partial correspondence with each respective most-likely acoustic state determined for each frame in the sequence of frames.

2. The acoustic-scene interpretation apparatus according to claim 1, wherein the plurality of acoustic features comprises at least one linear combination of constituent acoustic features correlated to a selected class of acoustic signal.

3. The acoustic-scene interpretation apparatus according to claim 2, wherein the class of acoustic signal comprises one or more of speech, music, and silence.

4. The acoustic-scene interpretation apparatus according to claim 1, further comprising a detector configured to detect a beginning or a terminus of an acoustic event corresponding to a change in the most-likely acoustic state.

5. The acoustic-scene interpretation apparatus according to claim 1, wherein the one or more classes of acoustic scenes comprises at least one of human speech, music, vehicle traffic and animal activity.

6. The acoustic-scene interpretation apparatus according to claim 1, wherein the acoustic-scene classifier comprises a voice-activity detector.

7. The acoustic-scene interpretation apparatus according to claim 1, wherein the recognition engine comprises at least one of a speech-recognition engine, a music-recognition engine, a vehicle-recognition engine and an animal-recognition engine.

8. The acoustic-scene interpretation apparatus according to claim 1, wherein each respective probability distribution of duration of an acoustic state corresponds to a selected class of acoustic scenes.

9. The acoustic-scene interpretation apparatus according to claim 1, wherein the correspondence between the most-likely acoustic state for each current frame and each respective probability distribution of duration comprises learned information gathered from one or more observed acoustic signals emitted from each of a plurality of classes of acoustic scenes.

10. A method of interpreting an observed acoustic scene, the method comprising:

converting an incoming acoustic signal to a corresponding electrical signal;

receiving a representation of the corresponding electrical signal comprising a sequence of frames and extracting from the representation a plurality of acoustic features corresponding to each respective frame;

determining a most-likely acoustic state for each current frame in the sequence of frames in correspondence with the respective plurality of acoustic features corresponding to a current frame and a selected probability distribution of duration of an acoustic state for each of one or more classes of acoustic scenes; and determining a transcription of the incoming acoustic signal in at least partial correspondence with each respective most-likely acoustic state determined for each frame in the sequence of frames.

11. The method according to claim 10, wherein the plurality of acoustic features comprises at least one linear combination of constituent acoustic features correlated to a selected class of acoustic signal.

12. The method according to claim 11, wherein the class of acoustic signal comprises one or more of speech, music, and silence.

13. The method according to claim 10, further comprising detecting a beginning or a terminus of an acoustic event corresponding to a change in the most-likely acoustic state.

14. The method according to claim 10, wherein the one or more classes of acoustic scenes comprises at least one of human speech, music, vehicle traffic and animal noise.

15. The method according to claim 10, wherein determining a most-likely acoustic state comprises discriminating between or among at least two of speech, music, and silence.

16. The method according to claim 10, wherein determining a transcription comprises at least one of identifying a human- or a machine-recognizable representation of the incoming acoustic signal, identifying an attribute characteristic of a class of music, identifying an attribute characteristic of a class of vehicle, and identifying an attribute characteristic of a class of animal.

17. The method according to claim 10, wherein each respective probability distribution of an acoustic state corresponds to a given class of acoustic scenes.

18. The method according to claim 10, wherein correspondence between the most-likely acoustic state for each current frame and each respective probability distribution of duration comprises learned information gathered from one or more observed acoustic signals corresponding to each of a plurality of classes of acoustic scenes.

* * * * *